UNITED STATES PATENT OFFICE.

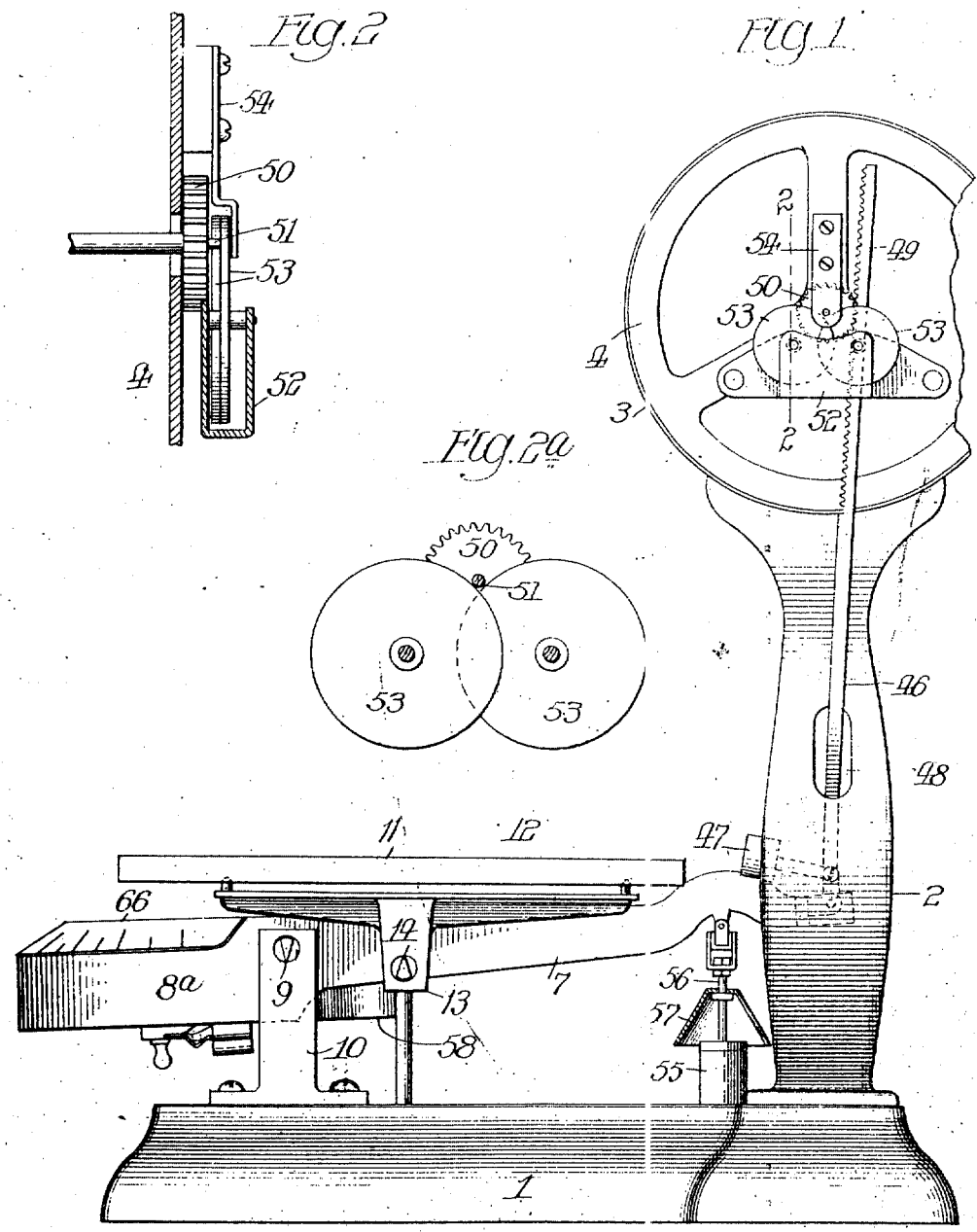

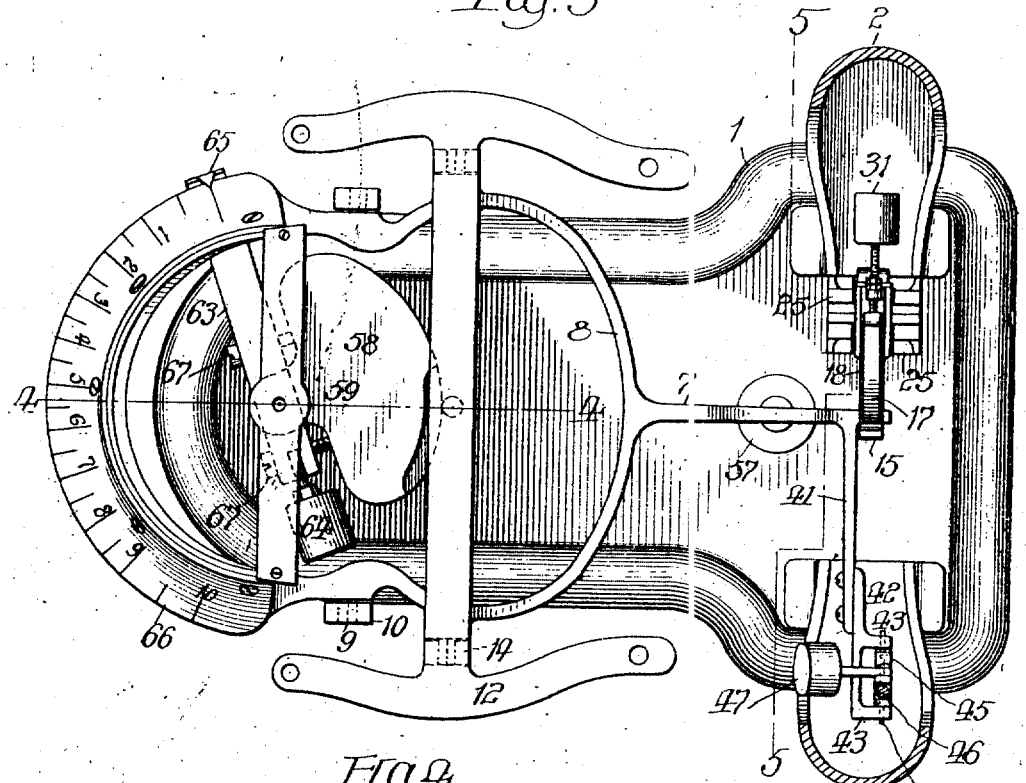
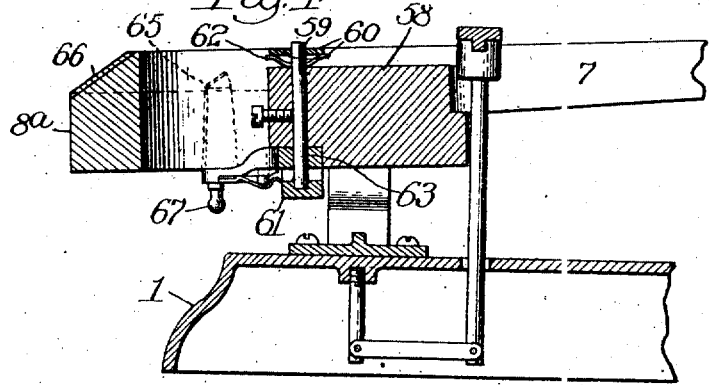
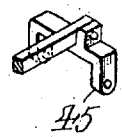

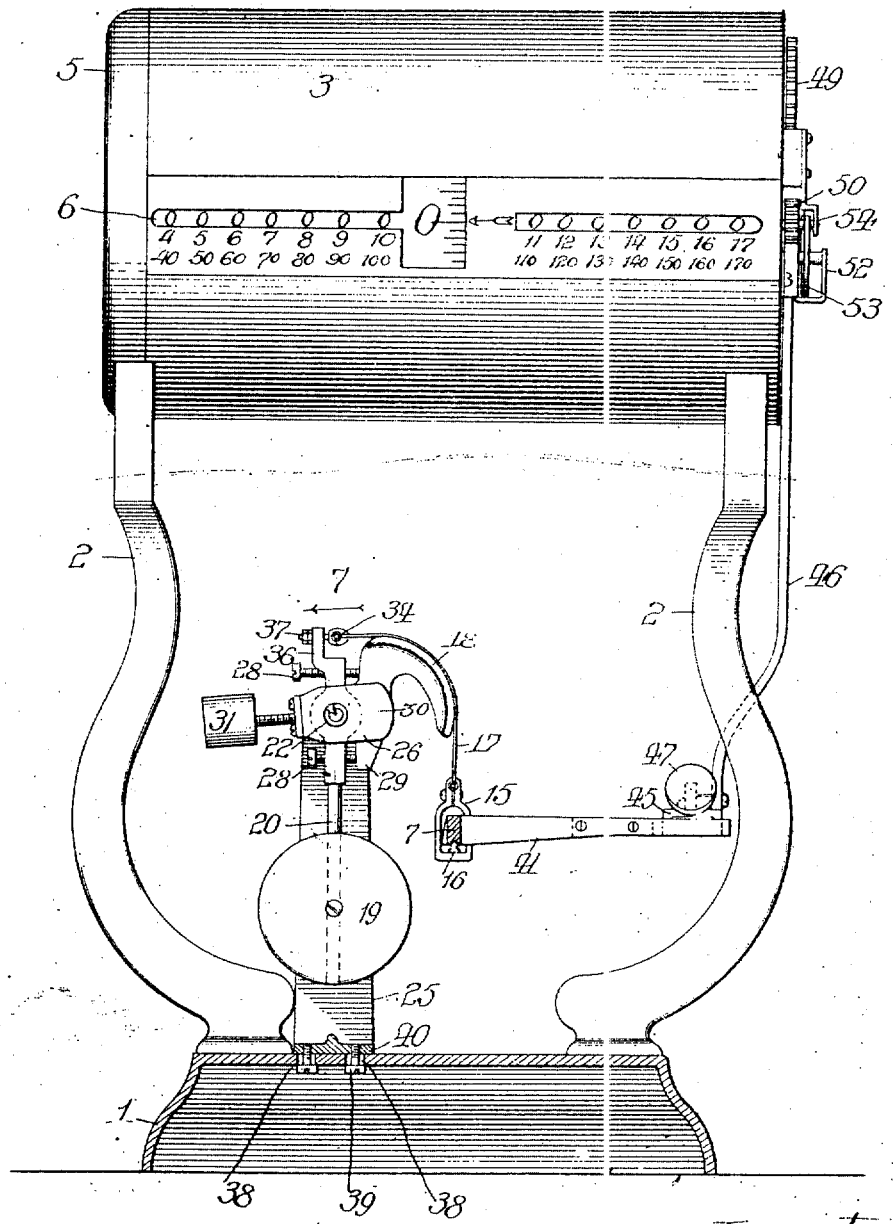

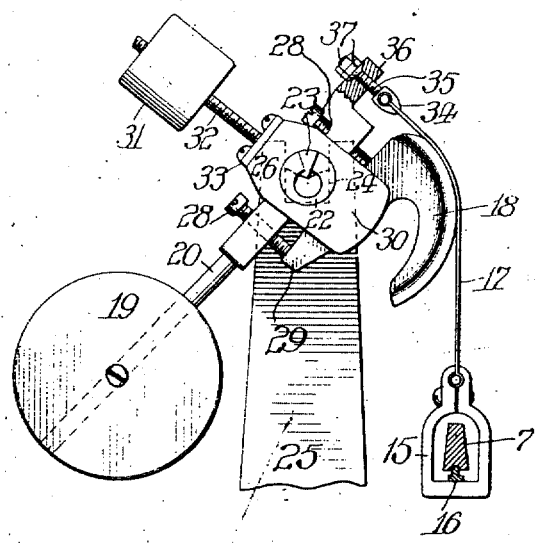

ALLEN DE VILBISS, JR., OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

SCALE.

1,223,371. Specification of Letters Patent. Patented Apr. 24, 1917.

Application filed September 1, 1906. Serial No. 332,932.

*To all whom it may concern:*

Be it known that I, ALLEN DE VILBISS, Jr., a citizen of the United States, residing at Toledo, in the county of Lucas and State of Ohio, have invented certain new and useful Improvements in Scales, of which the following is a specification.

My invention pertains to that class of scales commonly designated "computing scales" by which are indicated both the weight and the value of an article at any given price per pound or other unit of weight, and the particular type of computing scales to which my invention finds particular application and utility is the pendulum type, in which a pendulum actuated by a scale beam is operatively connected with the price computing and weighing mechanism proper.

The object of my invention is, in general, to produce an efficient and reliable scale of the character described, and to embody therein various novel and useful movements and constructions of advantage in the manipulation and adjustments of the scale, all as will be made apparent by the description hereinafter given.

In the drawings, Figure 1 is a side elevation of my scale; Fig. 2 an enlarged section on line 2—2 of Fig. 1; Fig. 2ª a detail view of the drum spindle bearing; Fig. 3 a sectional plan taken on a horizontal line just above the scale platform; Fig. 3ª a detail view of the bail 45; Fig. 4 a section on line 4 of Fig. 3; Fig. 5 a sectional elevation of the irregular line 5—5 of Fig. 3; and Figs. 6 to 10, detail views of the pendulum and its associated parts, such views being enlarged as compared with the general views.

My computing scale is of the pendulum type and its indicating mechanism is of the cylinder or barrel type, which is so well known as not to require specific description except as to certain novel operating mechanism therefor of my design and invention, as hereinafter described.

Referring more particularly to Figs. 1, 3. and 5 of the drawings, the frame of the machine or scale comprises a base 1 from one end of which rise two standards or supporting posts 2 upon whose upper end is mounted the cylindrical casing or housing 3 of the barrel form of indicating mechanism. Spider frames 4 are arranged in the opposite ends of the housing 3 and the same form supports for the novel bearings for the spindles of the rotatable indicating drum (not shown). The ends of the cylinder are inclosed or concealed by end caps 5, one of which caps is shown as removed in Fig. 5 to expose the operating mechanism.

The housing 3 has the usual longitudinal slot 6 through which the price and weight indications on the drum may be read, below which slot and on the casing is the usual series of figures indicating the price per pound or other unit of weight. Below this series may be arranged, if desired, another series, properly distinguished by different coloring or otherwise, which latter series is employed to give the proper reading when the capacity of the scale is increased by means of the tare device, which as hereinafter described provides for a tare of ten pounds. Hence in this particular instance the lower set or series of figures represents the products of the upper series of figures multipled by ten.

My scale is of the platform kind, comprising a scale beam or lever 7 whose front portion extends between the standards 2 for operative connection with the pendulum device and whose rear portion partakes of an irregular shaped frame 8 but which in general outline is substantially elliptical, in the present instance. The scale beam is pivoted at 9 in the short posts or supports, 10, rising from the base of the scale.

The platform here comprises the usual weighing plate 11 adapted to receive the article to be weighed or valued and resting upon a suitable frame 12 having legs 13 pivoted at 14 to the scale beam.

The forward end of the scale beam is connected to the pendulum mechanism by means of a stirrup 15 embracing the beam and having a pin bearing 16 entering the lower side or edge thereof as clearly indicated in Fig. 5. This stirrup is connected to a flexible strap or band 17 which lies flat upon and bears against the periphery of a rocking segment 18 supported and operatively connected with the pendulum proper in the following manner:

The pendulum itself, marked 19, is adjustably secured to the lower end of the pendulum rod 20, which is shown separate and detached in Fig. 8. Toward its upper end the rod has a hub portion 21 arranged to receive a cylindrical block 22 which is secured or keyed therein in any suitable manner, as by the set screw 21ª Fig. 8. This block has end projecting knife edge bearings 23 coöperating with the agate bearings 24 mounted in the upper ends of the two parallel supporting posts 25 rising from the base of the scale, Fig. 5.

The segment 18 is mounted on the ends of the block 22 projecting from opposite sides of the hub 21 of the pendulum rod and is adjustable axially thereon but movable in unison with the pendulum. To this end such segment is provided with the two parallel bearing lugs or ears 26, which may be formed or cast integral therewith, as seen in Fig. 10. These lugs 26 have registering holes 27 to receive the block 22. For the purpose of adjusting the segment to different relative positions with respect to the pendulum rod, its position on the block 22 may be shifted or adjusted by means of the two adjusting screws 28 screwing through the pendulum rod and bearing against the segment respectively above and below its pivotal axis. The upper screw bears against the upper portion or heel of the segment, while the lower one bears against the lug 29 depending from the body of the segment. By the use of these screws, the segment is adjusted and locked in any desired position relative to the pendulum rod. Inasmuch as the segment is described from the point 30 as a center, it is obvious that the distance of travel of the pendulum for each pound may be minutely regulated and adjusted.

To counterbalance the rocking parts of the pendulum mechanism as described, I provide a counter-weight 31 arranged to screw upon, and be thereby adjustable upon, a screw rod 32 which is secured to a plate 33 fastened across the ends of the lugs 26 of the segment.

The band 17, forming the connection between the stirrup and the pendulum rod, is secured at its upper end to a clamp 34, into which screws a bolt 35 passing through the laterally extended end 36 of the pendulum rod. Nuts 37 screwing on said bolt 35 enable the upper end of the band to be adjusted toward or away from the pendulum to thereby secure the proper adjustment of such connection between the pendulum mechanism and the scale beam.

For the purpose of adjusting the entire pendulum mechanism bodily transversely of the scale base, I provide such base with a series of transverse slots 38 (Fig. 5), to receive short screws 39 which are adapted to engage the lower end or cross-piece 40 of the standards or posts 25. By these means, the entire pendulum mechanism may be readily and conveniently adjusted as may be required.

Referring more particularly to Figs. 1, 3 and 5, the scale beam is connected to a transverse or lateral arm 41 which is secured to a second arm 42 provided with bearing lugs 43. In these lugs bears a pin 44 upon which is mounted, between such lugs, a bail 45 connected to the lower end of the operating rod 46 for actuating the indicating drum, see Fig. 3ª. To this bail is also connected the weight 47 whose function is to throw the operating rod toward the left (Figs. 1 and 3), so that the rack on such rod will be held in mesh with the drum operating pinion with a yielding pressure.

The operating rod is substantially vertical and passes through a side slot or opening 48 in one of the standards 2. The inner edge of the upper end of this operating rod is provided with a vertical rack 49 adapted to mesh with the pinion 50 secured to the spindle 51 of the right hand end (Fig. 5) of the indicating drum.

The pinion 50 is mounted in a novel and efficient manner, whereby friction is reduced to a minimum. As shown in Figs. 1, 2 and 5, a frame 52 is secured to the spider frame 4 of the cylinder or barrel and provided with bearings for the spindles of two idlers 53 arranged in parallel planes with their adjacent peripheries passing by each other, thereby providing a crotch in which the spindle 51 of the drum is loosely mounted. A plate 54 is secured to the spider frame and arranged to depend in front of the drum spindle and act as a stop against its lateral movement.

The forward end of the scale beam is connected with a dash-pot device 55 by means of a piston rod 56 to whose upper end is secured a hood or inverted cup 57. This hood is of such size as not to interfere with the movements of the beam and is designed to protect the dash pot cylinder against the entrance of foreign particles, particularly fine or granular articles being weighed, the hood acting to deflect such articles.

The scale beam is provided with a tare device comprising, in general terms, a movable or oscillating weight connected with a pointer or indicator coöperating with a scale.

As herein shown, the tare weight 58 is secured within the scale beam frame to a vertical pin 59 bearing in the upper and lower cross-bars 60 and 61 respectively. For the purpose of providing a frictional resistance for holding the tare weight in any given or set position, I arrange a spring 62 between the cross-bar 60 and the upper face of such weight, as clearly illustrated in Fig. 4. A hand lever 63 is mounted intermediate of its length on the pin 59 and the end is provided with an adjustable counter-weight 64, for balancing the weight of the hand lever. The outer end of this lever is on a plane with the lower or under surface of the semi-circular portion 8ª of the scale beam frame and projects therebeyond, where it is provided with an indicator or pointer 65 having its extreme upper end bent laterally and inwardly so as to coöperate with a semi-circular tare scale 66 which is here shown as separate from but affixed to the beveled-off corner of the scale beam frame, immediately in front of the salesman or operator. The hand lever has a knob 68 on its under side so that such lever may be shifted to any desired indication on the scale.

It is desirable to adjust the hand lever and the shifting weight relatively to each other in order that the pointer 65 may properly and accurately indicate the tare weight at all positions, as shown by the indications on the scale 66. To this end I provide adjusting screws 67 screwing through the hand lever on either side of its pivotal point and arranged to bear against an edge of the tare weight. By unscrewing one of these adjusting screws and screwing up the other one, the relative position of the hand lever and shifting weight is changed and the proper adjustment obtained for the purposes hereinbefore stated.

As shown in Fig. 10, the segment 18 is provided on its curved or segmental face on which the band 17 bears, with one or more longitudinal grooves or corrugations 18ª in order to decrease the amount of surface presented to such band and also to form pockets into which may finally work any dirt or other foreign matter that may get between the band and segment.

I claim:—

1. In a pendulum scale, the combination of a scale beam, indicating mechanism operated thereby, a pendulum, a flexible connection arranged between such beam and pendulum, and a segment coöperating with such connection and adjustable with respect thereto; substantially as described.

2. In a pendulum scale, the combination of a scale beam, indicating mechanism operated thereby, a pendulum, a flexible connection arranged between such beam and pendulum, and a segment movable in unison with the pendulum and coöperating with such connection, said segment being adjustable with respect to said connection; substantially as described.

3. In a pendulum scale, the combination, with a supporting frame, of a pendulum pivotally mounted therein, a scale beam, a flexible connection between such beam and pendulum, and a segment coöperating with such connection and adjustable rotarily of the pivotal axis of the pendulum; substantially as described.

4. In a pendulum scale, the combination of a scale beam, indicating mechanism operated thereby, a pendulum, a flexible connection arranged between such beam and pendulum, means for adjusting the length thereof, and a segment coöperating with such connection; substantially as described.

5. In a pendulum scale, the combination of a scale beam, indicating mechanism operated thereby, a pendulum, a flexible connection arranged between such beam and pendulum, a clamp adjustably held by the pendulum and secured to the flexible connection, and a segment coöperating with such connection; substantially as described.

6. In a pendulum scale, the combination of a scale beam, indicating mechanism operated thereby, a pendulum, a flexible connection arranged between such beam and pendulum and comprising a strap or band, and a segment on whose periphery the band bears, said segment being adjustable with respect to the band; substantially as described.

7. In a pendulum scale, the combination of a scale beam, indicating mechanism operated thereby, a pendulum, a flexible connection arranged between such beam and pendulum and comprising a strap or band, and a segment on whose periphery the band bears, such segment being described about a certain center and being axially adjustable from a different center; substantially as described.

8. In a pendulum scale, the combination of a scale beam, indicating mechanism operated thereby, a pendulum, a flexible connection arranged between such beam and pendulum and comprising a strap or band adjustably connected at its upper end to the pendulum and having at its lower end a stirrup engaging the scale beam, and a segment movable in unison with the pendulum and coöperating with the band; substantially as described.

9. In a pendulum scale, the combination of a scale beam, indicating mechanism operated thereby a pendulum, a flexible connection arranged between such beam and pendulum and comprising a strap or band clamped at one end adjustably to the pendulum, and having a stirrup connection at its other end with the scale beam, and a segment movable in unison with the pendulum and coöperating with the band, said segment being adjustable with respect to the band; substantially as described.

10. In a pendulum scale, the combination of a scale beam, indicating mechanism operated thereby, a supporting frame, a pendulum having a rod, a cylinder or block connected with such rod and having bearings in said frame, a segment mounted on such block, and a band passing over such segment and forming the operating connection between the rod and beam; substantially as described.

11. In a pendulum scale, the combination of a scale beam, indicating mechanism operated thereby, a supporting frame, a pendulum having a rod, a cylinder or block connected with such rod and having bearings in said frame, a segment mounted on such block, and rotarily adjustable thereon, and a band passing over such segment and forming the operating connection between the rod and beam; substantially as described.

12. In a pendulum scale, the combination of a scale beam, indicating mechanism operated thereby, a supporting frame, a pendulum having a rod, a cylinder or block connected with such rod and having bearings in said frame, a segment mounted on such block, adjusting screws extending through said rod and engaging the segment, and a band passing over such segment and forming the operating connection between the rod and beam; substantially as described.

13. In a pendulum scale, the combination of a scale beam, indicating mechanism operated thereby, a supporting frame, a pendulum having a rod, a cylinder or block connected with such rod and having bearings in said frame, a segment mounted on such block, adjusting screws extending through said rod on either side of its pivotal point and engaging the segment, and a band passing over such segment and forming the operating connection between the rod and beam; substantially as described.

14. In a pendulum scale, the combination of a scale beam, indicating mechanism operated thereby, a supporting frame, a pendulum having a rod provided with a hub, a cylinder or block secured in such hub and having bearings in said frame, a segment mounted on such block, and a band passing over such segment and forming the operating connection between the rod and beam; substantially as described.

15. In a pendulum scale, the combination of a scale beam, indicating mechanism operated thereby, a supporting frame, a pendulum having a rod provided with a hub, a cylinder or block secured in such hub and having bearings in said frame, a segment having bearing lugs 26 mounted on such block, and a band passing over such segment and forming the operating connection between the rod and beam; substantially as described.

16. In a pendulum scale, the combination of a scale beam, indicating mechanism operated thereby, a supporting frame, a pendulum having a rod provided with a hub, a cylinder or block secured in such hub and having bearings in said frame, a segment having bearing lugs 26 mounted on such block and adjustable rotarily thereon, and a band passing over such segment and forming the operating connection between the rod and beam; substantially as described.

17. In a pendulum scale, the combination of a scale beam, indicating mechanism operated thereby, a supporting frame, a pendulum having a rod provided with a hub, a cylinder or block secured in such hub and having bearings in said frame, a segment having bearing lugs 26 mounted on such block and adjustable rotarily thereon, adjusting screws extending through the rod and bearing against said segment, and a band passing over such segment and forming the operating connection between the rod and beam; substantially as described.

18. In a pendulum scale, the combination of a scale beam, indicating mechanism operated thereby, a supporting frame, a pendulum having a rod provided with a hub, a cylinder or block secured in such hub and having bearings in said frame, a segment having bearing lugs 26 mounted on such block and adjustable rotarily thereon, such segment being described from a center other than that around which it is adjustable, and an operating connection passing over such segment and connecting the rod and beam; substantially as described.

19. In a pendulum scale, the combination of a scale beam, indicating mechanism operated thereby, a supporting frame, a pendulum having a rod provided with a hub, a cylinder or block secured in such hub and having bearings in said frame, a segment having bearing lugs 26 mounted on such block and adjustable rotarily thereon, an adjustable counterweight connected with the segment, and a band passing over such segment and forming the operating connection between the rod and beam; substantially as described.

20. In a pendulum scale, the combination of a scale beam, indicating mechanism operated thereby, a supporting frame, a pendulum having a rod provided with a hub, a cylinder or block secured in such hub and having bearings in said frame, a segment having bearing lugs 26 mounted on such block and adjustable rotarily thereon, and a band passing over such segment and forming the operating connection between the rod and beam, such band being adjustably secured at one end to the pendulum rod; substantially as described.

21. In a pendulum scale, the combination of a scale beam, indicating mechanism operated thereby, a supporting frame, a pendulum having a rod provided with a hub, a cylinder or block secured in such hub and having projecting knife edge bearings resting on said frame, a segment mounted on such block and rotarily adjustable thereon, and a band passing over such segment and forming the operating connection between the rod and beam; substantially as described.

22. The combination of a scale beam, indicating mechanism operated thereby, a supporting frame, a pendulum having a rod pivoted intermediate of its length to such frame, a segment carried by such rod, and a flexible connection between the rod and beam comprising a band 17 bearing upon the periphery of the segment, a clamp 34 secured to the upper end of such band, and an adjustable screw bolt 35 for adjustably securing the clamp to the pendulum rod; substantially as described.

23. In a pendulum scale, the combination of a main frame, a scale beam supported thereon, indicating mechanism operated by the scale beam, pendulum mechanism actuated by such beam, and a supporting frame in which such pendulum mechanism is mounted and adjustable on said main frame to regulate the coöperative action between the latter and the pendulum in the effect produced on the indicating mechanism; substantially as described.

24. In a pendulum scale, the combination of a main frame, a scale beam supported thereon, indicating mechanism operated by the scale beam, pendulum mechanism actuated by such beam, and a second frame in which the pendulum mechanism is mounted, said second frame having a screw and slot connection with the main frame whereby to regulate the coöperative action between the latter and the pendulum in the effect produced on the indicating mechanism; substantially as described.

25. In a pendulum scale, the combination of a main frame, a scale beam supported thereon and extending longitudinally thereof, indicating mechanism operated by the scale beam, pendulum mechanism actuated by such beam, said main frame having transverse slots at one side of the scale beam, and a second frame carrying the pendulum mechanism and screws passing through said slots and engaging the second frame whereby the same is adjustable to and away from the scale beam to regulate the coöperative action between the latter and the pendulum in the effect produced on the indicating mechanism; substantially as described.

26. In a barrel form of scale, the means for operating the drum comprising in connection with said drum the vertically movable operating rod having a rack, a pinion arranged on the drum and engaged by the rack, a scale beam, an arm connecting said beam and operating rod, said rod being pivoted to such arm, and a weight also pivoted thereto and arranged to throw the operating rod in mesh with the pinion; substantially as described.

27. A computing scale comprising computing mechanism, a scale beam coöperating therewith, and a tare device consisting of a weight mounted to swing on said scale beam, and an indicating arm or lever adjustable in respect thereto; substantially as described.

28. A computing scale comprising computing mechanism, a scale beam coöperating therewith, and a tare device consisting of a weight mounted to swing on said scale beam, an indicating arm or lever pivoted on the same axis as said weight, and adjusting screws coöperating with said arm and weight for adjusting the relative position of such parts; substantially as described.

29. A computing scale comprising computing mechanism, a scale beam coöperating therewith, and a tare device consisting of a weight mounted to swing on said scale beam, an indicating arm or lever operatively connected with said weight, and adjusting screws coöperating with said arm and weight for adjusting the relative position of such parts; substantially as described.

30. A computing scale comprising computing mechanism, a scale beam coöperating therewith, and a tare device consisting of a weight mounted to swing on said scale beam, an indicating arm connected with said weight, and means for counterbalancing said arm; substantially as described.

31. A computing scale comprising computing mechanism, a scale beam coöperating therewith, and a tare device consisting of a weight mounted to swing on said scale beam, an indicating arm connected with said weight, and an adjustable counterweight carried on one end of said arm; substantially as described.

32. A computing scale comprising computing mechanism, a scale beam coöperating therewith, and a tare device consisting of a weight mounted to swing on said scale beam, and a spring bearing against the weight for imparting a frictional resistance thereto; substantially as described.

33. A computing scale comprising computing mechanism, a scale beam having one end formed as a frame 8 provided with cross bars, a pin 59 bearing in such cross bars, a weight 58 secured thereto, and an indicating arm 63 operatively connected with said weight; substantially as described.

34. A computing scale comprising computing mechanism, a scale beam having one end formed as a frame 8 provided with cross-bars, a pin 59 bearing in such cross-bars, a weight 58 secured thereto, and an indicating arm 63 mounted on said pin and operatively connected with said weight; substantially as described.

35. A computing scale comprising computing mechanism, a scale beam having one end formed as a frame 8 provided with cross-bars, a pin 59 bearing in such cross-bars, a weight 58 secured thereto, and an indicating arm 63 mounted on said pin and adjustably connected with said weight; substantially as described.

36. A computing scale comprising computing mechanism, a scale beam having one end formed as a frame 8 provided with cross-bars, a pin 59 bearing in such cross-bars, a weight 58 secured thereto, an indicating arm 63 pivoted on said pin, and means for adjusting the relative position of the arm and weight substantially as described.

37. In a pendulum scale, the combination of a scale beam, indicating mechanism operated thereby, a pendulum, a flexible connection between such beam and pendulum, and a segment coöperating with said connection and having its outer or curved face grooved; substantially as described.

38. A computing scale comprising computing mechanism, a scale beam having one end formed as a frame 8 provided with cross bars, a pin 59 bearing in such cross bars, a weight 58 secured thereto, and an indicating arm 63 pivoted intermediate of its length on said pin; substantially as described.

39. A computing scale comprising computing mechanism, a scale beam having one end formed as a frame 8 provided with cross bars, a pin 59 bearing in such cross bars, a weight 58 secured thereto, an indicating arm 63 pivoted intermediate its length on said pin, and adjusting screws passing through said arm on either side of its pivotal point and bearing against said weight.

40. A computing scale comprising computing mechanism, a scale beam having one end formed as a frame 8 provided with cross bars, a pin 59 bearing in such cross bars, a weight 58 secured thereto, and an indicating arm 63 pivoted on said pin and operatively connected with said weight, said arm having on its outer free end an upwardly and inwardly directed pointer 65; substantially as described.

41. In weighing scales, the combination of a main beam or lever, a pendulum, an eccentric segment arranged to swing with the pendulum and adjustable relatively thereto, and a flexible band overlying said segment and constituting an operating connection between the same and the beam.

42. In weighing scales, the combination of a main beam or lever, a pendulum structure comprising the pendulum proper and an eccentric segment adjustable relative thereto, and a flexible band connecting the pendulum structure to the beam, said band overlying the segment.

43. In weighing scales, the combination of a main beam or lever, a pendulum structure comprising the pendulum proper and an eccentric segment adjustable relative thereto, a flexible band connecting the pendulum structure to the beam, said band overlying the segment, and means for adjusting the effective length of said band.

44. In a computing scale, a scale beam, a computing mechanism comprising a scale drum mounted transversely of the beam, a pendulum counterbalance pivoted to swing transversely of the beam, a connection to the pendulum attached to the beam substantially in the longitudinal axis thereof, a laterally extending arm on the beam and connections therefrom to the drum for revolving the latter.

45. In a computing scale, a scale beam, a computing mechanism comprising a scale drum mounted transversely of the beam and having a pinion on its axis, a pendulum counterbalance pivoted to swing transversely of the beam, a connection to the pendulum attached to the beam substantially in the longitudinal axis thereof, a laterally extending arm on the beam and a rack bar connected thereto and engaging the pinion on the drum for revolving the latter.

ALLEN DE VILBISS, JR.

Witnesses:
NIELS M. HANSEN,
E. A. DRAKE.